United States Patent
Liu et al.

(10) Patent No.: US 11,206,590 B2
(45) Date of Patent: Dec. 21, 2021

(54) METHOD FOR REALIZING WIRELESS NETWORK CONVERGENCE

(71) Applicant: GUANGDONG NUFRONT COMPUTER SYSTEM CHIP CO., LTD, Guangzhou (CN)

(72) Inventors: Qianlei Liu, Beijing (CN); Shenfa Liu, Beijing (CN); Desheng Yan, Beijing (CN); Dongshan Bao, Beijing (CN)

(73) Assignee: GUANGDONG NUFRONT COMPUTER SYSTEM CHIP CO., LTD, Guangzhou (CN)

( * ) Notice: Subject to any disclaimer, the term of this patent is extended or adjusted under 35 U.S.C. 154(b) by 292 days.

(21) Appl. No.: 16/347,774

(22) PCT Filed: Dec. 7, 2016

(86) PCT No.: PCT/CN2016/108813
§ 371 (c)(1),
(2) Date: May 6, 2019

(87) PCT Pub. No.: WO2018/090411
PCT Pub. Date: May 24, 2018

(65) Prior Publication Data
US 2019/0320363 A1 Oct. 17, 2019

(30) Foreign Application Priority Data
Nov. 16, 2016 (CN) .......................... 201611007138.X

(51) Int. Cl.
*H04W 36/08* (2009.01)
*H04W 8/26* (2009.01)
(Continued)

(52) U.S. Cl.
CPC ............. *H04W 36/08* (2013.01); *H04W 8/26* (2013.01); *H04W 36/18* (2013.01); *H04W 80/02* (2013.01); *H04W 80/08* (2013.01); *H04W 88/08* (2013.01)

(58) Field of Classification Search
CPC ....... H04W 36/0011; H04W 36/00835; H04W 36/08; H04W 36/14; H04W 36/18;
(Continued)

(56) References Cited

U.S. PATENT DOCUMENTS 6,075,776 A * 6/2000 Tanimoto ............ H04L 12/4604
370/254
6,466,964 B1 * 10/2002 Leung ............... H04W 12/0431
709/202
(Continued)

FOREIGN PATENT DOCUMENTS

| CN | 101330460 A | 12/2008 |
|---|---|---|
| CN | 102088448 A | 6/2011 |

OTHER PUBLICATIONS

The World Intellectual Property Organization (WIPO) International Search Report for PCT/CN2016/108813 dated Jun. 9, 2017 5 Pages (including translation).

*Primary Examiner* — Dung B Huynh
(74) *Attorney, Agent, or Firm* — Anova Law Group, PLLC

(57) ABSTRACT

Disclosed in the present disclosure is a method for realizing wireless network convergence. The method comprises: constructing a convergence link table in an AP of a wireless network cell; arranging a user management system in an external network; when cross-cell movement of a user station occurs, the user management system configuring convergence link tables in corresponding access points (APs) of two cells; and based on the configured convergence link tables, data transmitted by the user station in an original
(Continued)

cell being transmitted in a new cell, thereby realizing wireless network convergence.

20 Claims, 2 Drawing Sheets

(51) Int. Cl.
  *H04W 36/18* (2009.01)
  *H04W 80/02* (2009.01)
  *H04W 80/08* (2009.01)
  *H04W 88/08* (2009.01)
(58) Field of Classification Search
  CPC ..... H04W 80/02; H04W 80/04; H04W 80/08; H04W 84/04; H04W 84/12; H04W 88/06; H04W 88/08; H04W 8/085; H04W 8/26
  See application file for complete search history.

(56) References Cited

U.S. PATENT DOCUMENTS

| | | | |
|---|---|---|---|
| 6,473,411 B1* | 10/2002 | Kumaki | H04L 29/06 370/331 |
| 6,473,413 B1 | 10/2002 | Chiou et al. | |
| 6,490,259 B1* | 12/2002 | Agrawal | H04L 45/00 370/331 |
| 6,510,144 B1* | 1/2003 | Dommety | H04W 36/18 370/328 |
| 6,668,282 B1* | 12/2003 | Booth, III | H04L 41/0681 709/223 |
| 6,842,462 B1* | 1/2005 | Ramjee | H04L 63/0823 370/466 |
| 7,239,618 B1* | 7/2007 | La Porta | H04L 29/06 370/331 |
| 7,995,533 B1* | 8/2011 | Koodli | H04W 36/0011 370/331 |
| 8,351,440 B2* | 1/2013 | Sawada | H04L 61/35 370/401 |
| 9,014,054 B2* | 4/2015 | Dunbar | H04L 12/4633 370/255 |
| 10,104,040 B2* | 10/2018 | Lin | H04W 36/0016 |
| 2001/0046223 A1* | 11/2001 | Malki | H04W 8/085 370/338 |
| 2002/0009066 A1* | 1/2002 | Shimizu | H04W 8/082 370/338 |
| 2002/0026527 A1* | 2/2002 | Das | H04L 29/12367 709/245 |
| 2002/0085518 A1* | 7/2002 | Lim | H04W 36/0011 370/331 |
| 2002/0126642 A1* | 9/2002 | Shitama | H04L 29/06 370/338 |
| 2002/0133595 A1* | 9/2002 | Kimura | H04L 29/06 709/227 |
| 2002/0136226 A1* | 9/2002 | Christoffel | H04W 36/0038 370/401 |
| 2002/0154638 A1* | 10/2002 | Shahrier | H04L 29/12462 370/400 |
| 2003/0112803 A1* | 6/2003 | Matsugatani | H04L 29/12311 370/389 |
| 2003/0225892 A1 | 12/2003 | Takusagawa et al. | |
| 2004/0156365 A1* | 8/2004 | Suzuki | H04L 12/66 370/389 |
| 2004/0176095 A1* | 9/2004 | Yamada | H04W 36/0011 455/445 |
| 2004/0192307 A1* | 9/2004 | Watanabe | H04W 36/32 455/436 |
| 2004/0196818 A1* | 10/2004 | Iwasaki | H04W 40/36 370/338 |
| 2004/0221042 A1* | 11/2004 | Meier | H04L 12/4625 709/227 |
| 2005/0013280 A1* | 1/2005 | Buddhikot | H04L 61/251 370/349 |
| 2005/0053011 A1* | 3/2005 | Ohbayashi | H04W 40/02 370/252 |
| 2005/0074015 A1* | 4/2005 | Chari | H04L 29/12018 370/400 |
| 2005/0147062 A1* | 7/2005 | Khouaja | H04W 36/30 370/332 |
| 2005/0195782 A1* | 9/2005 | Yokota | H04W 36/0011 370/338 |
| 2005/0213545 A1* | 9/2005 | Choyi | H04W 8/087 370/338 |
| 2005/0271015 A1* | 12/2005 | Nishida | H04W 36/0011 370/331 |
| 2006/0048212 A1* | 3/2006 | Tsuruoka | H04L 9/0866 726/4 |
| 2006/0056369 A1* | 3/2006 | Morishige | H04W 48/17 370/338 |
| 2006/0059264 A1* | 3/2006 | Leung | H04W 60/00 709/227 |
| 2006/0067344 A1* | 3/2006 | Sakurai | H04L 12/2854 370/401 |
| 2006/0146803 A1* | 7/2006 | Bae | H04W 12/062 370/352 |
| 2006/0171370 A1* | 8/2006 | Matsumoto | H04W 36/0011 370/351 |
| 2006/0215595 A1* | 9/2006 | Hancock | H04W 8/04 370/328 |
| 2006/0215623 A1* | 9/2006 | Lin | H04L 29/12018 370/338 |
| 2006/0271664 A1* | 11/2006 | Ono | H04L 61/2061 709/223 |
| 2006/0280146 A1* | 12/2006 | Koodli | H04W 36/0011 370/331 |
| 2007/0097919 A1* | 5/2007 | Tsubota | H04L 29/12028 370/331 |
| 2007/0118594 A1* | 5/2007 | Takeda | H04L 41/0803 709/203 |
| 2007/0153741 A1* | 7/2007 | Blanchette | H04L 45/66 370/331 |
| 2007/0275726 A1* | 11/2007 | Lee | H04W 36/0016 455/436 |
| 2008/0112414 A1* | 5/2008 | Beak | H04W 8/08 370/392 |
| 2008/0205345 A1* | 8/2008 | Sachs | H04W 36/0011 370/332 |
| 2009/0154421 A1* | 6/2009 | Hong | H04W 36/0016 370/331 |
| 2009/0172143 A1* | 7/2009 | Ishimoto | H04L 61/1541 709/223 |
| 2009/0238193 A1* | 9/2009 | Nishida | H04W 8/08 370/401 |
| 2010/0135301 A1* | 6/2010 | Bosch | H04L 45/52 370/392 |
| 2010/0157963 A1* | 6/2010 | Choi | H04L 12/66 370/338 |
| 2011/0016227 A1* | 1/2011 | Feng | H04W 40/248 709/245 |
| 2012/0014350 A1* | 1/2012 | Kim | H04W 36/0022 370/331 |
| 2012/0201186 A1* | 8/2012 | Awano | H04L 12/1877 370/312 |
| 2012/0307659 A1* | 12/2012 | Yamada | H04L 12/66 370/252 |
| 2013/0083724 A1* | 4/2013 | Sindhu | H04L 45/50 370/328 |
| 2013/0305332 A1* | 11/2013 | Narasimhan | H04W 12/082 726/7 |
| 2014/0023044 A1* | 1/2014 | Sjolinder | H04L 67/2814 370/331 |
| 2014/0192774 A1* | 7/2014 | Liu | H04W 76/12 370/331 |
| 2015/0245392 A1* | 8/2015 | Chan | H04W 76/12 370/331 |
| 2016/0028554 A1* | 1/2016 | Lea | H04W 12/02 370/312 |

(56) References Cited

U.S. PATENT DOCUMENTS

2016/0165506 A1\* 6/2016 Lin .................... H04L 12/1886
370/331
2017/0171149 A1\* 6/2017 Cheng ................ H04L 61/1535
2018/0063761 A1\* 3/2018 Senoo .................. H04W 36/06

\* cited by examiner

METHOD FOR REALIZING WIRELESS NETWORK CONVERGENCE

This PCT patent application is a national phase entry under 35 U.S.C. § 371 of International Application No. PCT/CN2016/108813, filed on Dec. 7, 2016, which claims priority of Chinese Patent Application No. 201611007138.X, filed on Nov. 16, 2016. The above enumerated patent applications are incorporated by reference herein in their entirety.

FIELD OF THE INVENTION

The present disclosure relates to the field of wireless network communication, especially relates to the convergence of wireless network.

BACKGROUND OF THE INVENTION

With the continuous development of wireless communication technology and network technology, wireless networks have got more and more applications. In addition to cellular communication technology, a variety of wireless network technologies suitable for different scenarios have been proposed and applied in the corresponding scenarios. For example, WiFi technology that enables fast data communication in a small covered area, ZigBee technology that realized many nodes accessed and Wimax technology, which can provide fast wireless Internet access for users in a wide area, etc. Beijing NUFRONT Company has also proposed an ultra-high data rate wireless LAN technology (EUHT technology), which can provide a higher data rate than WiFi technology, and can provide users with mobile speed support, with greater coverage than WiFi technology, supports greater mobile speed, and provides higher data rate. At present, the EUHT technology has been applied to the network access of the high-speed rail system, and wireless broadband access in rural areas. In addition, it is expected that with the development of the wireless communication technology and the network technology, more wireless network technologies for specific scenarios will emerge.

Although the above wireless network technology can enable the user sites in a wireless network cell to achieve corresponding communication performance, the cells are usually isolated, and the data link between user stations and the station in external network are established after user station accessing a cell, the data link is usually discontinuous when the user station leaves the cell. For example, after a WiFi user station leaves the current WiFi cell and enters an adjacent WiFi cell, the data link established through the current cell will be interrupted. This is even more so for different types of wireless network cells. For example, when a WiMAX-WiFi dual-mode terminal leaves the WiFi cell and enters the WiMAX cell, the data stream originally transmitted in the WiFi cell will be interrupted, and the transmission cannot be continued in the WiMAX cell. In many cases, the user station restarts the original data link in the newly entered cell, and will retransmit many data that have been transmitted already. This will not only seriously affect the user experience, but also waste bandwidth of the wireless network system. At the macro level, this isolated wireless network cell is wasteful for system resources. If these isolated wireless network cells can be merged together, it is a wireless network system integrated together for user site, not only improve user experience of the data service, but also greatly increase available bandwidth for data transmission of the wireless network system. Therefore, it has a good application prospect for the network convergence of the isolated wireless network cell at present.

SUMMARY OF THE INVENTION

To solve these problems, a method for implementing the network convergence of the wireless network cells is proposed in present disclosure. The wireless network cell may be a wireless network adopting same physical layer and MAC layer communication standard, or a wireless network adopting different physical layer and/or MAC layer communication standards.

A method for implementing the wireless network convergence, which is characterized in, comprising:

constructing a convergence link table in an access point AP of a wireless network cell, setting up a user management system in an external network, when the user station moves across the cell, the user management system configuring convergence link tables of the corresponding to APs in the two cells, the data that the user site transmitted in an original cell being transmitted in a new cell based on the configured convergence link tables.

Said convergence link table of the AP comprising:

a wireless forwarding table, used for confirming a user station has left the current cell, entered a new cell: AP finding its wireless MAC address according to IP address of the user site, or confirming that the user site has left the current cell and entered a new cell;

a transfer-out link table, used for finding the forwarding addresses forwarding the data packets of the user station: for the user station that has left current cell and entered a new cell, the table providing the forwarding addresses which forward the data packets sent to the user site;

when the cell in where the AP is located contains a user station configured with a current IP address, further including: a transfer-in link table, used for finding local IP addresses of user stations in current cell: for the user station that has entered the current cell from others and has been configured with a local IP address, the table providing the local IP address of the user site in the current cell when the AP of original cell forwards the data packet to the user station.

Wherein said wireless forwarding table may be:

| IP address of user station | MAC address of user |
| --- | --- | wherein, table entry of the MAC address of the user site is an invalid value, means that the corresponding user site has left current cell and entered a new cell.

Said transfer-out link table may be:

| IP address of user site in | Global IP address of transfer-out |
| --- | --- | said transfer-in link table may be:

| Global IP address of | IP address of the | Local IP address |
| --- | --- | --- |

Said user management system may be:

comprising a user manager, used for managing the latest location information of the user station and configuring the convergence link table of the AP;

or comprising at least two user managers and user information aggregator, used for uniformly summarizing the location information of user stations;

said user manager includes a user location information table, which may be:

| Name of the user station | Global IP address of current AP of the user station | IP address of the user station in current cell |
| --- | --- | --- | said user information aggregator includes a user information summary table, which may be:

| Name of user station | User manager address of current AP | Global IP address of current AP of the user station | IP address of user station in current cell |
| --- | --- | --- | --- |

Said name of the user station may be:

when the wireless network cell in the wireless network convergence system is a wireless network cell that adopting the same physical layer and MAC layer communication standard, MAC address of user wireless network card is taken as name of the user station.

By querying the configured convergence link table, said AP can not only find address of next hop station to which the AP transmit forward direction data packet, but also find the address of the next hop station to which the AP transmit reverse direction data packet;

here, the data transmission from the correspondent user station to the user station is defined as forward direction, data transmission from the user station to the correspondent user station is defined as reverse data transmission.

The data transmitted by the user station in the original cell are transmitted in the new cell based on the configured convergence link table, specifically as following:

In addition to data packet transmission between the original cell AP and the correspondent site of the user site, the forwarded data packet encapsulated by means of IP in IP at each station, in which the original IP packet encapsulated is the data packet transmitted between the original cell AP and the user site in the original cell.

The data are transmitted in the new cell based on the configured convergence link table, where the user station obtains the address of the next hop site of the reverse transmission data packet, specifically comprising:

after receiving the forwardly transmitted IP in IP packets forwarded by its last hop site, the user station uses source address of the IP in IP packets as address of next hop site when it transmits the data packets reversely.

A wireless network convergence system, which is characterized in that comprising:

a user management system in the external network and the wireless network cells connected to the external network, which are composed of the AP and the user station;

a convergence link table is set in the AP;

a user management system including a user manager that can dynamically configures the convergence link table in the AP.

The user management system comprising:

a user manager, which is used for managing the latest location information of the user station and configuring the convergence link table of the AP;

or at least two user managers and one user information aggregator, used to uniformly summarize the location information of the user station; wherein, the user location information table is set in the user manager, and the user location information summary table is set in the user information summary device.

An access point device of the wireless network cell, comprising:

configuring convergence link table, used for:

when user station moves across wireless network cell, by providing a data transmission link between access point AP in previous cell and user station in new cell, so said AP and said user station joined up; The table at least includes a wireless forwarding table and a transfer-out link table, a wireless forwarding table, used for indicating information on a user station has left the current cell, entered a new cell: the AP finding its wireless MAC address according to IP address of the user in current cell, or confirms that the user station has left the current cell and entered a new cell;

a transfer-out link table, used for finding the forwarding addresses of the data packets forwarded by the user stations: for the user station that has left current cell and entered a new cell, the table provides the forwarding addresses of the data packets sent to the user station;

when the cell in where the AP is located contains a user station configured with a local IP address, further including: a transfer-in link table, used for finding local IP addresses of user station in current cell: for the user station that has entered the current cell from others and has been configured with a local IP address, the table providing the local IP address of the user station in current cell when the AP of original cell forwards the data packet to the user station.

said access point device, wherein, said wireless forwarding table used for indicating information on a user station has left current cell, entered a new cell, specifically is:

for the user station that didn't move across-cell in a cell, AP implements the function of normal wireless forwarding by the table.

A terminal of a wireless network, which is characterized in, comprising:

a IP address parsing module, used for taking the source address of the IP in IP packet as address of the next hop station of the data packets transmitted reversely by the terminal after confirming that the original IP packet encapsulated in the received IP in IP packet is a converged forwarding data packet sent to itself.

DETAILED DESCRIPTION OF THE EMBODIMENTS

Figure 1:
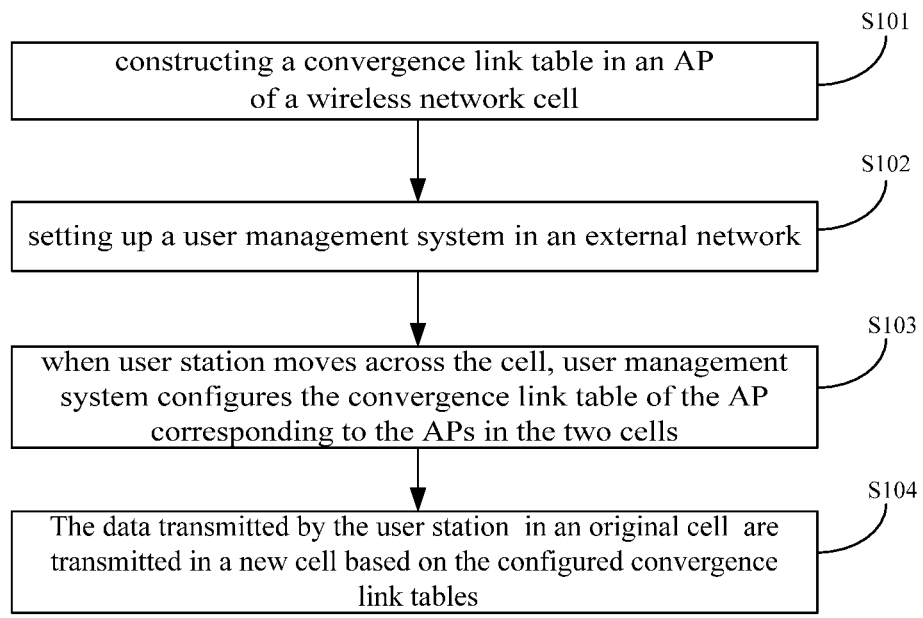
FIG. 1 is a flow chart showing a processing procedure for implementing wireless cell network convergence according to an embodiment of the present disclosure.

The invention provides a method for realizing network convergence of the wireless network cell. When the user station enters another wireless network cell from one wireless network cell, through this network convergence the data stream that is being transmitted in the previous cell gets the same transmission after entering the latter cell, as if the movement hadn't happened. That is to say, the above two wireless network cells are fused together and can be regarded as a entirety for user station.

In the method proposed by the present disclosure, a wireless network cell is composed of an access point (AP) and a plurality of user stations. The AP implements wireless coverage of user stations in the cell by adopting a wireless communication technology, and the AP is also connected to the external network, so that user station in the cell may access the internet through the external network. The wireless coverage of the user station in the cell by the AP includes both the case AP as a central base station implements direct physical signal coverage for all user stations in the cell, and the case AP may implement wireless connection for all user stations in the cell through covering directly or multi-hop transmission. For instance, the cell is a wireless mesh network (wireless mesh network) cell.

In the method proposed by the present disclosure, there are some wireless network cells that are connected to a common external network through its own AP. The wireless network cells may be the wireless network cells using the same wireless communication technology, or wireless network cells using different wireless communication technologies. The same kind of wireless communication technology here refers to a technology that adopts the same physical layer and MAC layer wireless communication standard, and different kinds of wireless communication technologies refer to technologies that adopt different physical layer and/or MAC layer wireless communication standards.

A typical example of a common external network to which these wireless network cells are connected is the Internet.

In the method proposed by the present disclosure, the AP of the wireless network cell refers to a station in the wireless network that can implement wireless coverage of the user station on the one hand, and connect to the external network, and can communicate with the external network on the other hand. This station may have different names in different wireless communication protocols.

In the method proposed by the present disclosure, the station in the wireless network cell and the external network to which the wireless network cell is connected support the IP protocol, including but not limited to the IPv4 protocol and the IPv6 protocol.

In the method provided by the present disclosure, when a user station accesses a certain wireless network cell, an IP address is assigned to the user station by a certain station, usually an AP, and the IP address configured by the user station is divided into two types of IP addresses, global IP address and local IP address. Generally, the AP configures global IP address for all user stations or local IP address for all user stations in the wireless network cell, and accordingly, the wireless network cells are divided into two types of cells, one is the cell configured with global IP address, another is the cell configured with local IP address. The two types of cells are also respectively referred to as global IP cell and local IP cell in the description of the present disclosure.

In special cases, the AP can also configure global IP address for some user stations in its cell and local IP address for other user stations. For the convenience of description, such a cell is also referred to as a local IP cell, and the corresponding AP is also referred to as an AP of the local IP cell in the description of the present disclosure.

In the method proposed by the present disclosure, for a local IP cell, the AP of the cell must support a Network Address Translation (NAT) protocol or other equivalent protocols, by means of address translation through the protocol, implement the communication between the user station that only has a local IP address and the station of the external network.

In the IPv6 protocol, all stations will be configured with the global IP addresses, hence, there will be no local IP cells.

When the user station leaves a wireless network cell and enters another wireless network cell, for the sake of brevity, in the description of the present disclosure, the original wireless network cell is referred to as the original cell, and the corresponding AP is the original cell AP or the original AP, the newly entered wireless network cell is referred to as a new cell, and the corresponding AP is a new cell AP or a new AP.

In the method proposed by the present disclosure, after the user station accesses a certain wireless network cell, it communicates with another station outside the current cell via the AP of the cell, and realizes data transmission between each other, or it is also possible to communicate with another station of the current cell via the AP to implement data transmission between each other. For the convenience of description, the present disclosure refers to the station that communicates with the current user station and implements data transmission, which is called the corresponding station of the user station, referred to as corresponding station.

The data transmission between the user station and its corresponding station includes data transmission from the corresponding station to the user station and data transmission from the user station to the corresponding station. For the convenience of description in the present disclosure, data transmission from the corresponding station to the user station is called forward data transmission, and data transmission from the user station to the corresponding station is called reverse data transmission.

In the IP protocol, there is an IP in IP mechanism, which is a technology that encapsulates one IP packet (called the original IP packet) in another IP packet (called an encapsulated IP packet), and uses the original IP packet as the load of an encapsulated IP packet to transfer. In the method proposed by the present disclosure, both the AP and the user station need to support the IP in IP mechanism. In the description of the present disclosure, the original IP packet and the encapsulated IP packet in the IP in IP mechanism are also respectively referred to as an inner IP packet and an outer IP packet, and the term IP in IP packet refers to an encapsulated IP packet. The address of the IP in IP packet refers to the address of the encapsulated IP packet.

In a network supporting the IP protocol, the AP of the wireless network cell sends an IP data packet to the user station under its coverage, and it is necessary to maintain a network layer address-MAC layer address correspondence table in its network layer part, that is, an IP address-MAC address correspondence table. In the IPv4 protocol, this table is also called an ARP (Address Resolution Protocol) table. The IP address-MAC address correspondence table is composed of a plurality of table rows, and each table row represents the address corresponding information of a user station, specifically: two entries including IP address of user station and MAC address of user station. When the corresponding station of the user station sends a data packet to the user station, the AP receives the data packet, and obtains IP address of the user station, and through the IP address-MAC address correspondence table, it can obtain wireless MAC of the user station, then forwards this packet to the user station. Since the IP address-MAC address correspondence table plays a role in forwarding the IP data packet from the corresponding station of the user station to the wireless user station in the data transmission of the AP, in the description of the present disclosure, it is called wireless forwarding table. The structure of the current wireless forwarding table in the AP is shown in Table 1.

TABLE 1

Wireless forwarding table in the AP

| IP address of user station | MAC address of user station |
|---|---|

Referring to FIG. 1, the method for wireless network convergence proposed by the embodiment of the present disclosure is implemented by the following steps:

S101. constructing a convergence link table in an AP of a wireless network cell.

S102. setting up a user management system in an external network.

S103. when the user station moves across the cell, the user management system configures the convergence link table in corresponding access points (APs) of two cells.

S104. the data transmitted by the user station in an original cell are transmitted in a new cell based on the configured convergence link tables.

Thereout, the wireless network convergence is achieved.

For the data transmission of the user station, the effect of the network convergence is: for the application program that invokes the data transmission or other application in the user stations, the data packets they received or sent in the new cell are no difference from the data packets they received or sent in the original cell.

The function of convergence link table in AP is:

When user station moves across wireless network cell, by providing a data transmission link between access point AP in previous cell and user station in new cell, the AP and the user station joined up (namely, this link is a convergence connection), thereby implement data transmission. The convergence link table in AP includes a wireless forwarding table and a transfer-out link table; when the cell in where the AP is located contains a user station configured with a local IP address, the convergence table in AP further includes a transfer-in link table.

In the method proposed by the present disclosure, a convergence link table in AP comprises a wireless forwarding table. Functions of the wireless forwarding table related to the convergence link is, indicating information on a user station has left the current cell, entered a new cell: AP finds its wireless MAC address according to the table, or confirms that the user station. This is achieved by making a new regulation for the table entry value of the user station MAC address of the current wireless forwarding table in the AP: This entry can be filled in as an invalid MAC address value of the user station. Examples of invalid MAC address value of the user station, such as MAC address of the AP itself, MAC address of the non-user station defined by the MAC protocol, and so on. The present disclosure uses an invalid MAC address of user station in the wireless forwarding table to indicate that the corresponding user station has left the cell and entered a new cell. In this way, the AP can distinguish its current working state according to the table row information of the user station searched in the wireless forwarding table: when the user station is wirelessly accessing the local cell, the MAC address corresponding to the user station in the table row of the wireless forwarding table is available; when the user station has left the cell and enters a new cell, the MAC address in the table row corresponding to the user station in the wireless forwarding table is an invalid MAC address of user station; when the user station has left the cell but does not enter the new cell, the corresponding table row of the user station cannot be found in the wireless forwarding table.

The function of the transfer-out link table in the AP is: when the user station leaves the local cell and enters another one, the table provides the forwarding address for forwarding the data packet of the user station addressed to the cell. The structure of the transfer-out link table is shown in Table 2. The table is composed of a plurality of table rows, and each table row includes two entries of IP address of the user station in the current cell and global IP address of the transfer-out target user station. IP address of the user station in the cell may be a global IP address or a local address.

TABLE 2

Transfer-out link table in the AP

| IP address of the user station in the current cell | Global IP address of the transfer-out target user station |
|---|---|

When there is a user station configured with a local IP address in the wireless network cell covered by the AP, a transfer-in link table is further included in the AP.

The function of the transfer-in link table is: for the user station that has entered the local cell from others and has been configured with a local IP address, when the original cell AP forwards data packet to the user station, local IP address in the cell for the forwarding packet is provided by searching the table. The structure of the transfer-in link table is shown in Table 3. The table is composed of a plurality of table rows, each table row includes three entries of global IP address of the original AP, IP address of the user station in the original cell, and local IP address of the user station in the current cell, wherein IP address of the user station in the original cell may be global IP address or local IP address.

TABLE 3

Transfer-in link table in the AP of the local IP cell

| Global IP address of the original AP | IP address of the user station in the original cell | Local IP address of the user station in the current cell |
|---|---|---|

The method of the present disclosure implements the configuration of the convergence link table in an AP by the user management system, which is set in an external network. The user management system includes at least one user manager that configures the convergence link table of the APs of the wireless network cells in an area. When the distribution area of the wireless network cell that needs to implement network convergence is relatively wide, a plurality of user managers may be set, and each user manager configures the convergence link table of the AP in one area, further, a user information aggregator to summarize the information of the user site is set up for these no less than 2 sets of user managers. When the two wireless network cells traversed by the user station are respectively managed by different user managers, the user manager corresponding to the AP in where the user station newly entered wireless network cell can obtain information about the current user station in the original wireless network cell through the user information aggregator.

Figure 2:
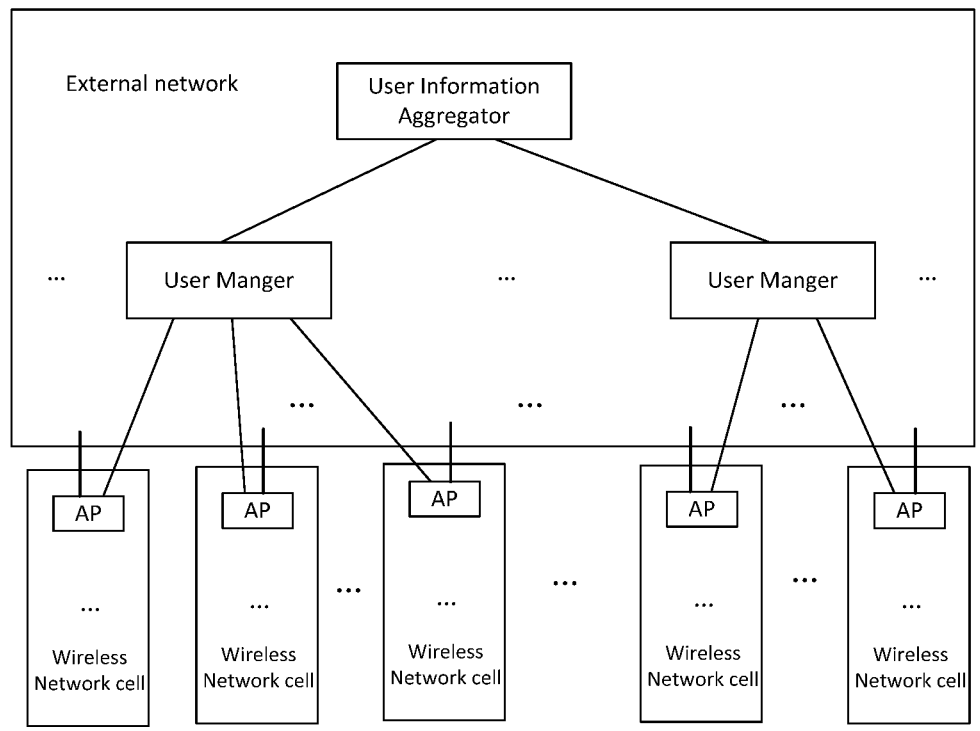
FIG. 2 is a schematic diagram of a wireless network convergence system architecture according to an embodiment of the present disclosure.

In the method proposed by the present disclosure, a system composed of a user management system in an external network and wireless network cells (including an AP and all user stations) connected to the external network is called a wireless network convergence system or a wireless convergence system. FIG. 2 shows a schematic diagram of a wireless network convergence system. In the figure, the data transmission line between AP and the external network is indicated by a thick solid line, and the signaling transmission line between AP and the user manager is represented by a thin solid line. It is represented by logical lines, not physical lines, which may be implemented using the same physical line in the actual system.

In the wireless network convergence system, the user manager is used to manage the latest location information of the user station, and it uniformly registers the location information of the user through the user location information table as shown in Table 4. The table is composed of a plurality of table rows, and each table row includes three entries, including name of the user station, global IP address of the current user station AP, and IP address of the user station in the current cell, wherein IP address of the user station in the current cell may be global IP address or local IP address. The user location information table stores the location information of subordinate user stations of all subordinate APs of the user manager.

TABLE 4

User location information table in the user manager

| Name of user station | Global IP address of current user station AP | IP address of user station in the current cell |
|---|---|---|

In the user location information table, name of the user station can be generated via unifying compilation for the user station in advance by the user management system, and each user station corresponds to a unique user station name Each user station knows in advance its own name in the wireless network convergence system before accessing the wireless network convergence system.

In the case that the designer is only ready to implement network convergence of the same type of wireless network cells, all the wireless network cells adopt the same physical layer and MAC layer communication standard, and the user stations enter the wireless network cells with the same network card. In such a wireless network convergence system for implementing network convergence on an isomorphic wireless network cell, the user management system may use the MAC address of the wireless network card used by the user station in these cells as its user station name, without implementing unifying compilation in advance by the management system.

When there are multiple user managers in the convergence system of the wireless network, a user information aggregator is used to uniformly summarize the location information of the user stations in the user managers. The user information aggregator implements a summary of user information through its user location information summary table.

The structure of the user location information summary table of the user information aggregator is as shown in Table 5. The table consists of a number of table rows, and each table row contains name of the user station, address of the user manager to which the current AP belongs, global IP address of the current AP of the user station, and IP address of the user station in the current cell. Compared with Table 4, the table adds a user manager address table column to which the current AP belongs, which is used to save the address of the user manager to which the current AP of the user station belongs.

TABLE 5

Summary table of the user location information for user information aggregator

| Name of the user station | User manager address of the current AP | Global IP address of the current AP of the user station | IP address of the user site in the current cell |
|---|---|---|---|

In the method proposed by the present disclosure, the user manager realizes a connection with the AP of a wireless network cell through a network link in the external network. This connection may use a bandwidth-guaranteed connection, so that when the user manager or AP needs to send signaling to the other party, it can send signaling to the target site in time through this connection, and it will not happen that signaling cannot be transmitted timely because of network congestion. An example of implementing a bandwidth-guaranteed connection is implemented by the RSVP (Resource Reservation Protocol) protocol, this protocol reserves bandwidth for each station along the connection, thereby realizing bandwidth reservation for the entire connection.

Connection between the user manager and the user information aggregator can also use a bandwidth-guaranteed connection.

In fact, in the method proposed by the present disclosure, the amount of information of the transmitted data is small, whether between the user manager and the AP, or between the user manager and the user information aggregator. There is broadband connection configured such as fibers in the external network, which can achieve proximately performance of bandwidth-guaranteed connection.

When a user station that was originally not connected to the wireless network convergence system accesses an AP in the wireless network convergence system, the user station reports its own name in the wireless network convergence system to the AP during the access process, the AP configures an IP address for the user station. Then the AP reports access information of the user station to the user management system in a signaling manner. The signaling includes the user station's name and IP address of the user station configured in the cell where the user station is in.

After receiving the foregoing signaling, the user manager obtains the global IP address of the current AP of the user station by the source address of the IP packet encapsulating the signaling, in addition to the user station's name and the IP address of the user station in the current cell.

The user manager searches for the user's station name as a match item in its user location information table. Since the user station has not previously accessed the wireless network convergence system, the user manager will not find the corresponding item; the user manager sends signaling to the user information aggregator, the user information aggregator searches for the user's station name as a match item in its user location information table, similarly, the user information aggregator will not find the information of the user station. The user information aggregator sends signaling that the user station is not connected to the system to the user manager, and the user manager creates a new table row in the user location information table, and fills in the corresponding information according to the name of the entry. At the same time, the user information aggregator also creates a new table row in its user location information summary table, and fills in the corresponding information content according to the entry name.

Figure 3:
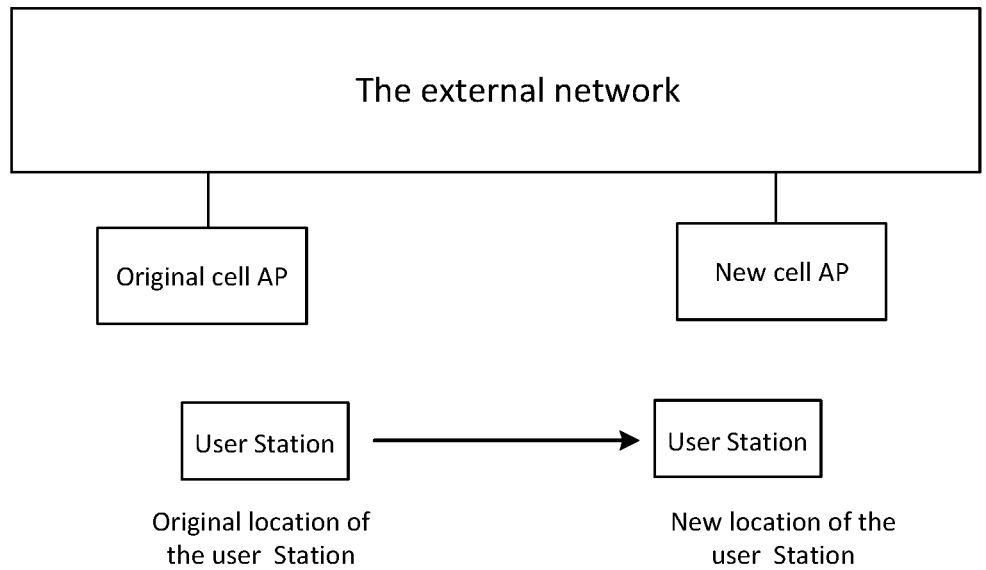
FIG. 3 is a schematic diagram of a cross-cell movement of a user station in an embodiment of the present disclosure.

In the working process of the wireless network convergence system, it occurs that a user station spanned from one wireless network cell to another, as shown in FIG. 3, in this case, the user station first accesses an AP in a new cell through a wireless manner, then the AP configures an IP address for the user station. Thereafter, the AP reports information about the user accessing its cell to the user manager, which is implemented by sending signaling to the user manager, and the signaling includes information about the user station's name and the IP address configured by the user station in the cell of its own.

After receiving the foregoing signaling, the user manager obtains the global IP address of the current AP of the user station by the source address of the IP packet encapsulating the signaling, in addition to the user station's name and the IP address configured by the user station in the current cell.

The user manager searches the user location information table with the user station's name as a matching item. If the corresponding table row is found, it indicates that the user station has moved across the cells under the same user manager; if the corresponding table row is not found, then, it sends signaling to the user information aggregator, and the user information aggregator searches in its user location information summary table. Since the user station has already accessed other cells of the wireless network convergence system, the user information aggregator is able to find the location information.

After the user manager finds the user station name in its own user location information table or the user information summary table of the user information aggregator, it extracts the original location information of the user station, which is the global IP address of AP of the original cell the user station was in and the IP address of the user station in the original cell. Then, the user manager sends signaling to the original AP (if the original AP belongs to another user manager, the current user manager will send location change signaling to the original user manager, and then the original user manager sends the corresponding signaling to the original AP), the signaling includes the following information: IP address of the user station in the original cell, and the global IP address of the transfer-out target user station. If the user station is configured with a global IP address in the new cell, the global IP address will be the global IP address of the transfer-out target user station. If the user station is configured with the local IP address in the new cell, the global IP address of the new cell AP will be the global IP address of the transfer-out target station. After receiving the above signaling, two address information mentioned above will be extracted by the original AP and be used to the configuration of the transfer-out link table of itself.

In the case when the user station moves across the user manager (i.e., APs in the two cells it spanned respectively belong to different user managers), the original user manager completes the configuration of the original AP transfer-out link table, deletes the table row corresponding to the user station in the user location information table of the user. Thereafter, the user information aggregator will also send an inquiry signaling to it again to confirm that whether the user table row is deleted. If corresponding table row has not been deleted due to some fault, the table row will be forcibly deleted.

When the user station moves from the original cell to the new cell, if the user station is configured with a global IP address in the new cell, only the transfer-out link table of the original cell AP needs to be configured; and if the user station is configured with the local IP address in the new cell, then the transfer-in link table of the new cell AP needs to be configured as well.

After the user manager searches for the original location information of the user station through its own user location information table, and then completes the corresponding configuration of the convergence connection table for the AP. It updates location information of the user station in its own user information table, and report the location information to the user information aggregator. The user information aggregator updates the table row of the corresponding user station in its own user location information summary table, in the process, if it is found that IP address of the manager which sending singling is different from the value in the user manager address table entry of the current AP to which the update table row belongs, the user information aggregator can know that the current user station has moved across the user manager, and therefore, it is directed to the user. The user manager of the site sends a signaling to the user manager which the user station belongs to, to confirm whether table row of the corresponding user station has been deleted. If it has not been deleted, it is required to delete the corresponding table row.

When the user station moves from the original cell to a new cell, the user manager of the original cell AP implements the configuration of its convergence link table by sending signaling to the original cell AP, and the configuration includes: configuring its wireless forwarding table and the configuration of the transfer-out link table.

The configuration of the convergence link table of the original cell AP is: the original cell AP receives the signaling of configuration of convergence link table sent by the user manager, and said signaling includes IP address of the user station in the original cell and global IP address of the target station; taking IP address of the user station in the original cell as the search term, find the table row where the user station is located in the wireless forwarding of AP, and then set the MAC address entry of the user station of the table row to an invalid value; then, create a new table row in the transfer-out link table of the AP, and fill in the corresponding values in the entries of IP address in the current cell of the user station and global IP address of the transfer-out target user station.

When the user station moves from the original cell to a new cell, if the user station is configured with a global IP address in the new cell, it is not necessary to configure the convergence link table of the new cell AP. In the case that the user station is configured with local IP address in the new cell, user manager of the new cell AP sends a signaling to the new cell AP to configure the convergence link table (the signaling includes global IP address of the user station in the original cell and IP address of the user station in the original cell), which implements the configuration of its transfer-in link table. Specifically, the new cell AP receives the signaling of the configuration convergence link table sent by the user manager, then it newly creates a table row in its own transfer-in link table, and fills in three entries of the table row with the corresponding values, that is to say, table entry for the global IP address of the original AP is filled in global IP address of the original cell AP sent by the user manager, and the entry for the IP address of the user station in the original cell is filled in IP address of the user station in the original cell sent by the user manager, and the entry for IP address of the user station in the current cell is filled in local IP address of the user station in the new cell.

Alternatively, the user manager or the new cell AP may also configures the IP address of the next hop station of the data packets transmitted reversely to the user station by sending signaling to the user station, while configuring the convergence link table of the AP. Specifically, in the case that the user station is configured with local IP address in the new cell, the new cell AP sends a signaling to the user station to inform the address of the next hop station of the reverse transmission data packet: that is to say, local IP address of the new cell AP; in the case that the global IP address is configured for the user station in the new cell, the user manager to which the original cell AP belongs sends signaling to configure the next hop station to the user station, where the signaling includes global IP address of the original cell AP. After receiving the signaling, the user station obtains the above global IP address as the address of the next hop station when it reversely transmits data packet. In this case, after the user site moving across the cell, it can transmit data packets reversely to its correspondent station without receiving the forward-transmitted data packet.

After the user manager completing the configuration of the convergence link table of the original cell AP and the new cell AP, the data that the user station is transmitting in the original cell when the move occurs will be transferred to the new cell to continue to get transmitted based on the convergence link constructed by the convergence link table in the AP.

In the method provided by the present disclosure, the user management system may include multiple user managers and one user information aggregator, or may only include one user manager. In the above description of the configuration of the convergence link table of the user by the user management system, it is assumed that the user management system includes multiple user managers and one user information aggregator. For the case of only one user manager, the above processing steps need to be simplified only.

The data packet transmitted between the user station and its correspondent station, whether it is a forward-transmitted data packet or a reverse-transmitted data packet, when the data packet arrives at the original cell AP or the new cell AP (in the case that the user station is configured with local IP address in the new cell), according to its convergence link table the corresponding AP can find the address of the next hop station that forwards the packet, and then forward the packet to the next hop station. Specifically, the original cell AP finds the address of the next hop station of the forward or reverse transmitted data packet according to the transfer-out link table, and the new cell AP finds the address of the next hop station of the forward or reverse transmitted data packet according to the transfer-in link table.

In the method proposed by the present disclosure, in addition to the data transmission between the original cell AP and the correspondent station of the user station, the data packet is encapsulated in the form of IP in IP and being transmitted by each station, when the original cell AP sends data packets to its next hop site according to transfer-out link table and the new cell AP sends data packets to its next hop site according to the transfer-in link table, or at the time when the user station is sending a data packet to its next hop station reversely. The source IP address of the outer IP packet is the IP address of the sending station itself, the target address of the outer IP packet is the IP address of the next hop station, and the IP packet encapsulated in the IP in IP packet (that is, the original IP packet) is: data packets sent between the original cell AP and the user station under the assumption that the user station is still in the original cell.

When the original cell AP, the new cell AP, or the user station receives the data packet sent to itself which is encapsulated in the form of IP in IP, and it is assumed that this may be a converged transmitted data packet and attempts to deal with it according to procedure that is required for the transmission of the convergence data. Specifically, if the AP finds that the received data packet matches the table row in the configured convergence link table of itself, performs further process according to the matched table row; otherwise, discards the data packet. If the user station finds that the received data packet is matched with the convergence data stream transmitted by itself, it will accept it as a data packet sent to itself, otherwise, discard the data packet.

After the user station moving across the cell to a new cell, for the data packet transmitted between the user station and its correspondent station, the original cell AP can find the address of the next hop station that forwards the data packet according to its own transfer-out link table. The process which the original cell AP finds the address of its next hop station for the forward-transferred data packet and the reverse-transferred data packet is described by the flow S1 and S2, respectively.

Flow S1: The original cell AP receives the IP data packet sent by the correspondent station of the user station, and obtains that it is a data packet sent to the user station according to target IP address of the data packets, and it processes the data packets just like the user station is still in the original cell, and sends the data packets to the wireless forwarding table according to the IP address of the user station; in the wireless forwarding table, when the AP finds that the MAC address of the corresponding user station is invalid, meaning that the user station has left the local cell and entered a new cell. Therefore, it searches for the table row where the user station is located in the transfer-out link table by using the IP address of the user station as the search term, and gets the global IP address of the target station of the table row, which is the address of the next hop station that the current packet will be forwarded to. Flow S2: after the original cell AP receiving an IP in IP packet sent to it by a global IP address, it is assumed that this may be a converged transmitted data packet, and attempts to deal with it according to the manner that is used for the processing of the convergence data packet, and then de-capsulate the IP in IP packet and obtains source address of the inner IP packet and source address of the outer IP packet. It searches the transfer-out link table for the table row that meets the following conditions: IP address entry of the user station in the current cell is equal to source address of the inner IP packet mentioned above, global IP address of the transfer-out target station is equal to source address of the outer IP packet mentioned above. And if the table row that meets the condition is found, it is indicated that the current inner IP packet obtained is the data packet which is sent to the correspondent station by the user station in the original cell, and the target IP address of the inner IP packet is the address of the next hop station.

After the user site moving across the cell into a new cell, if the user station is configured with a local IP address in the new cell, the new cell AP may find the address of the next hop station that forwarded the packet transmitted between the user station and its correspondent station, based on its own transfer-in link table. The process in which the new cell AP finds its address of next hop station for data packet transmitted forwardly and reversely is described by flows S3 and S4, respectively.

Flow S3: after the new cell AP receiving an IP in IP packet sent to it by a global IP address, it is assumed that this may be a converged transmitted data packet, and attempts to deal with it according to the manner that is used for the processing of the convergence data packet, and then de-capsulate the IP in IP packet and obtains the source address of the outer IP packet and the target address of the inner IP packet; the two IP addresses obtained above will be compared with the IP address of the original AP entry and the IP address of the user station in the original cell entry of each table row in the transfer-in link table at the same time, if both two entries matched, the local IP address of the user station corresponding to the table row will be the address of the next hop station that transmitting the current packet.

Flow S4: after the new cell AP receiving an IP in IP packet sent to it by a local IP address, it is assumed that this may be a converged transmitted data packet, and attempts to deal with it according to the manner that is used for the processing of the convergence data packet, then de-encapsulates the IP in IP packet and obtains source address of the inner IP packet and source address of the outer IP packet; the two IP addresses obtained above will be compared with IP address entry in the original cell of the user station and local IP address entry of the user station in the local cell of each table row in the transfer-in link table at the same time, if the two entries both match, the global IP address of the original AP corresponding to the table row will be the address of the next hop station that transmitting the current packet.

After the user station moving across the cell into a new cell, for the data packet transmitted between the user station and its correspondent station, the user station can obtain the address of the next hop station sending the packet to its correspondent station through the reversed link, according to the data packet received from its correspondent station. And the specific procedure is described in the flow S5.

Flow S5: after the user station receiving an IP in IP packet sent to it, it is assumed that this may be a converged transmitted data packet, and attempts to deal with it according to the manner that is used for the processing of the convergence data packet, then de-encapsulates the IP in IP packet and obtains the inner IP packet and source address of the outer IP packet. The user station compare IP address of the inner IP packet and the TCP/UDP port number and other information with the information corresponding to the data being received from its correspondent station, if the comparison proves that it is the IP packet sent by its correspondent site to itself, the user station takes the source address of the obtained outer IP packet (i.e. IP in IP packet) as the address of the next hop station when sending packets to its correspondent site on the reverse link.

Compared with the foregoing method for directly configuring the address of the user station by the user manager or by the new cell AP, the method has the advantages of less configuration steps and easier operation. For user station, in most cases, forward transmission is performed as the primary data service, such as accessing to the portal, downloading data from a server in the network, and so on. In such a case, it is more suitable to adopt the method of flow S5 to enable the user station to obtain the address of the next hop station of its reverse transmission packet.

According to the method for obtaining the next hop station address by each user station as described above, and the method for sending a data packet based on the IP in IP packet after each site obtaining the address of the next hop station, the transmitted data stream continues to be transmitted in the new cell after the user station moving across the cell. A whole description of the implementation flow of the data transmission is given below, which includes the flow of packet transmission on the forward link and on the reverse link.

The process of processing the transmitted data packets by each station on the link when the data packets sent from the correspondent station of the user site are transmitted on the forward link is as follows.

The original cell AP: the original cell AP receives the data packet from the correspondent station of the user station, and processes the data packet in the same manner as the case that the user station is still in the local cell, and obtains an IP data packet to be sent to the user station; The original cell AP obtains the address of the next hop station that transmits the data packet according to flow S1; the original cell AP constructs an IP in IP packet for the inner IP packet by using the data packet prepared to be sent to the user station, and then sends the packet to the next hop station.

New cell AP: In the case of that the user station is configured with the global IP address in the new cell, the new cell AP will not receive the IP in IP packet sent to it; in the case of that the user site is configured with the local IP address in the new cell, the new cell AP performs the following processing: the new cell AP receives the IP in IP packet from the last hop station, obtains the inner IP packet, and obtains the address of the next hop station according to the flow S3; by using the obtained inner IP packet the new cell AP constructs an IP in IP packet for the inner IP packet prepared to be sent to the next hop station, and then sends the packet to the next hop station.

User station: The user station receives the IP in IP packet sent by the last hop station and extracts the inner IP packet; after that, it treats the data packet as the packet it received when it was in the original cell, and deal with it.

When a packet sent from a user station to its correspondent site is transmitted on the reverse link, the process of processing the transmitted packet by each station on the link is as follows.

User station: the data packet sent to its opposite station as if it were in the original cell; it constructs the IP in IP packet for the inner IP packet with the data packet, and uses the address of the next hop station by flow S5, or the address of the next hop station of the reverse transmission packet configured by the user manager or the new cell AP as the target address of the IP in IP packet transferred reversely, and then sends the IP in IP packet to the next hop station.

New cell AP: in the case of that the user station configures the global IP address in the new cell, the new cell AP will not receive the IP in IP packet sent to it; in the case of that the user station is configured with the local IP address in the new cell, the following is performed: the new cell AP receives the IP in IP packet from the last hop station, obtains its inner IP packet, and obtains the address of its next hop station according to flow S4; by using the inner packet obtained as the inner packet, the new cell AP construct the IP in IP packet is d, which is destined for the next hop station, and then sends the packet.

The original cell AP: the original cell AP receives the IP in IP packet from the last hop station, obtains the inner IP packet, and obtains the next hop station as the correspondent station of the user station according to flow S2; The packet is regarded as the IP data packet sent to it by the user station in the case of that the user station was still in the original cell, and then processes as if the user station was still in the original cell, sends the data packet to the correspondent site.

In the transmission process of the data packets of the correspondent station of the user station and the user station in the new cell, data packets received by the user station are the data packets sent to it as if it was still in the original cell. In the same way, the data packet that it transmits to its correspondent site is also the same as that when it is still in the original cell, so whether the user station is in the original cell or in the new cell, for the application or other applications of the user station, the data packets received or sent are the same, thus realizing the indiscriminate transmission of data transmitted between the user station and its correspondent station in the original and new cells.

In the method proposed by the present disclosure, the redundancy of the table can be eliminated in time by adopting a method of setting a maximum silent period for the table row of the convergence link table of the AP. Specifically, set a maximum silent period for each table row of the AP's convergence link table. If a table row is not used for more than the maximum silent period, the AP considers that the table row has expired and expires, and deletes the table row from its convergence link table.

In the technical scheme proposed by the present disclosure, the wireless network cell AP and the user station include at least a network layer part and a lower network layer part, wherein the network layer part implements the functions of supporting IP protocol, to which the network layer related, and the following layer under the network layer implements the functions of the physical layer and MAC layer of the station.

The technical scheme proposed by the present disclosure implements the convergence of the wireless network cells by constructing a convergence link table in the AP, which is located in the part of network layer of the AP. The convergence table of the AP includes at least a wireless forwarding table and a transfer-out link table. When the wireless network cell in where the AP is located includes a user station configured with the local IP address, the convergence link table of the AP further includes a transfer-in link table.

Figure 4:
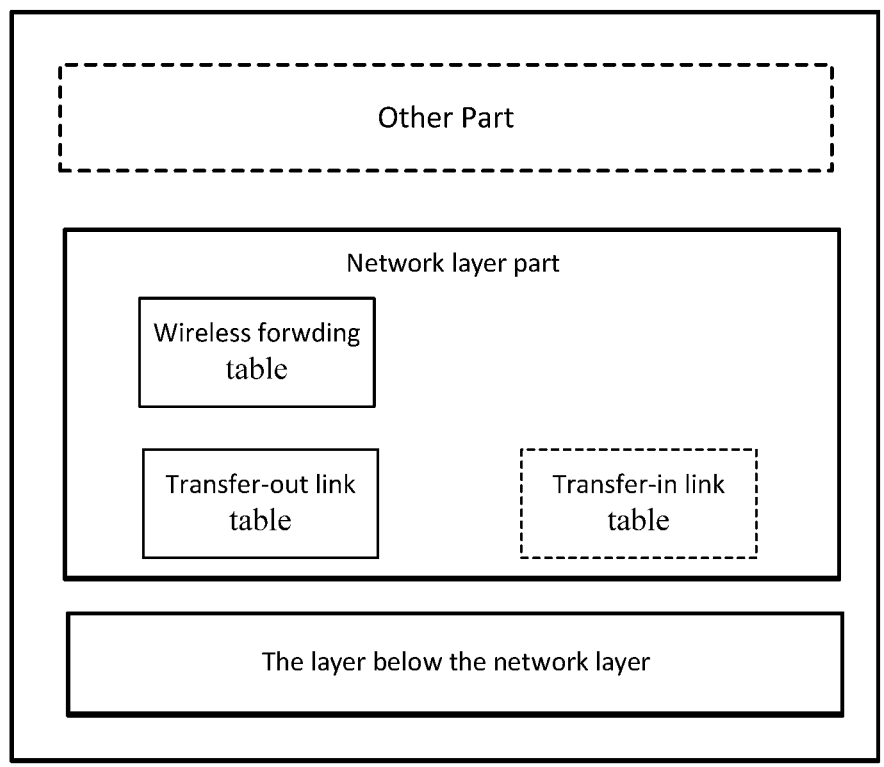
FIG. 4 is a structural schematic diagram of an access point AP device according to an embodiment of the present disclosure.

The structure of the access point AP device is as shown in FIG. 4, wherein a dotted frame indicates that this part may not exist.

In the technical scheme provided by the present disclosure, when the user station moves from one wireless network cell to another one, the configuration of the convergence link table of the AP can realize non-differential transmission of the user station in the original cell and in the new cell. Non-differential transmission is meant that for the applications or other applications in the user station that invoke the data transmission, they are indistinguishable when they are in the original cell and in the new cell.

A wireless network convergence system is further disclosed by the present disclosure, which is composed of a user management system in the external network and a wireless network cell connected to the external network, and the cell is composed of an AP and a user station. A convergence link table is set in the AP; the user management system includes a user manager, which can dynamically configure the convergence link table.

The user management system in the wireless network convergence system either includes a user manager or includes at least two user managers and a user information aggregator. The user manager is configured to manage the latest location information of the user station and configure the convergence link table of the AP; the user information aggregator is used to uniformly summarize the location information of the user station.

A user manager in a wireless network convergence system has also been disclosed by the present disclosure, it is a station, in which a user location information table is configured. The user manager can configure the convergence link table in the AP of the wireless network cell by sending signaling, in order to implement the convergence of cells in different wireless networks.

The invention also discloses a user information aggregator in a wireless network convergence system, which is a station and is internally provided with a user location information summary table. The user information aggregator can provide location information of the user station for other stations in the wireless network convergence system.

The invention also discloses an AP of a wireless network cell, which is internally provided with a convergence link table. When the user station moves across the wireless network cell, the convergence link table connects the AP of the primary cell and the user station located in the new cell by providing a path for transmitting data, though which the data transfer between the original cell AP and the user station located in the new cell can be implemented.

The convergence link table in the AP includes at least a wireless forwarding table and a transfer-out link table. When the wireless network cell where the AP is located has a user station configured with a local IP address, and the convergence link table of the AP further includes a transfer-in link table. Further, the wireless forwarding table is used for indicating that the user station has left the local cell and entered a new cell; and the transfer-out link table is used for providing the address of the data to be forwarded from the original cell to the new cell for the user station that has left the cell and entered a new one; and the transfer-in link table is used for providing the send address of the converged transmission data forwarded to the current user station from the current cell AP, which is the local IP address of the user in the current cell and is performed when the original cell AP is forwarding the data packet under the condition that the user station configured with a local IP address has entered the current cell from others.

The wireless forwarding table in the AP can automatically distinguish the status of the current location of the user station. Whether the user station is still in the local cell, or has left the cell and entered a new one, or has already left the cell but not entered the new cell will be clear according to the information of the wireless forwarding table itself.

For a user station that has left the cell and enters a new one, the data packet sent by the correspondent station to itself is forwarded to the new cell for transmission through the convergence link table in the AP, and for the user who is in the cell and has not moved. The station, when the data packet sent to it by the correspondent station passes the wireless forwarding table within the AP's converged link table, will be transmitted normally by obtaining the wireless MAC address of the user station. In other words, the AP uses the wireless forwarding table to indicate the information that the user station has left the local cell and entered a new cell, but the indication does not affect the wireless forwarding function of the user station that does not move, and for the user station in the cell where no handover occurs, the AP implements the functions of normal wireless forwarding through the table.

The invention also discloses a terminal of the wireless network (i.e., the user station of the wireless network), which comprises an IP address resolution module, and the module is used for: after the confirmation of that the inner IP packet of the IP in IP packet received is the converged transmitted data packet transmitted to itself, the source address of the IP in IP packet will be the next hop station of data packet that is going to be transmitted reversely.

The present disclosure can be implemented or used by those skilled in the art in light of the embodiments disclosed.

Various modifications to these embodiments are obvious to those skilled in the art, and the general principles defined herein may be applied to other embodiments without departing from the scope and spirit of the invention. The above-mentioned embodiments are merely preferred embodiments of the present disclosure, and are not intended to limit the present disclosure. Any modifications, equivalents, improvements, etc., which are included in the spirit and principles of the present disclosure, should be included in the scope of protection of the present disclosure.

What is claimed is:

1. A method for implementing wireless network convergence, comprising:
   constructing a convergence link table in an access point (AP) of a wireless network cell, the convergence link table of the AP including a wireless forwarding table and a transfer-out link table, wherein each entry of the wireless forwarding table records a correspondence between an IP address and a MAC addresses of a user station in the wireless network cell, and each entry of the transfer-out link table records a correspondence between an IP address of a user station before leaving the wireless network cell and global IP address information of a transfer-out target station after the user station leaves the wireless network cell;
   setting up a user management system in an external network, the user management system being connected to the plurality of APs, and each AP having the corresponding convergence link table;
   when a first user station moves from an original cell having an original AP to a new cell having a current AP, obtaining, by the user management system, a name of the first user station, a current IP address of the first user station in the new cell, and a global IP address of the current AP reported by the current AP;
   determining, by the user management system according to the name of the first user station, a global IP address of the original AP and an original IP address of the first user station in the original cell;
   sending, by the user management system to the original AP, a signaling to configure a first entry of the transfer-out link table of the original AP with the original IP address of the first user station in the original cell and current global IP address information of the first user station, wherein the global IP address information of the transfer-out target station in the first entry is configured to be the current IP address of the first user station if the first user station is configured with a global IP in the new cell, and to include both the current IP address of the first user station and the global IP address of the current AP if the first user station is configured with a local IP in the new cell; and
   transmitting data that the first user station transmitted in the original cell to the new cell based on the transfer-out link table of the original AP and a wireless forwarding table of the current AP.

2. The method according to claim 1, wherein
   when the first user station is configured with the local IP in the new cell, said convergence link table of the current AP of the new cell further includes: a transfer-in link table that records a correspondence among the current local IP address of the first user station, the global IP address of the original AP, and the original IP address of the first user station in the original cell, the transfer-in link table being used to locate the first user station based on the local IP address of the first user station in the current cell when the original AP of the original cell forwards the data packet to the current AP destinating the first user station.

3. The method according to claim 2, wherein, said transfer-in link table includes a data field for IP address of user station in the corresponding cell, a data field for global IP address of a previous AP that the user station was located, and a data filed for IP address of the user station at the previous AP.

4. The method according to claim 1, wherein said wireless forwarding table includes a data field for IP address of a user station and a data field for MAC address of the user station, and the MAC address of the user station being an invalid value indicates that the corresponding user station has left the corresponding cell and entered a new cell.

5. The method according to claim 1, wherein, said transfer-out link table includes a data field for IP address of a user station before leaving the corresponding cell and a data field for global IP address information of transfer-out target station.

6. The method according to claim 1, wherein, said user management system comprises:
   a user manager, for managing the latest location information of the user station and configuring the convergence link table of the AP; or,
   at least two user managers and user information aggregators, for uniformly summarizing the location information of user stations.

7. The method according to claim 6, wherein, said user manager includes a user location information table that includes a data field for name of user station, a data field for IP address of user station in current cell and a data filed for global IP address of current AP where the user station is located.

8. The method according to claim 7, wherein:
   when all wireless network cells in the wireless network convergence system adopt a same physical layer and MAC layer communication standard, MAC address of user wireless network card of each user station is taken as the name of the user station.

9. The method according to claim 6, wherein, said user information aggregator includes a user information summary table, which includes a data field for name of user station, a data field for address of user manager that current AP corresponding to the user station belongs to, a data field for global IP address of the current AP corresponding to the user station, and a data field for IP address of the user station.

10. The method according to claim 1, further comprising:
    finding, by each AP by querying the configured convergence link table, address of next hop station to which the AP transmit forward direction data packet, and the address of the next hop station to which the AP transmit reverse direction data packet;
    wherein the data transmission from a correspondent user station to a user station is defined as forward direction, data transmission from the user station to the correspondent station is defined as reverse data transmission.

11. The method according to claim 10, the forward direction data packet being an IP in IP packet, and the method further comprising:
    after receiving the forwardly transmitted IP in IP packets forwarded by its last hop station, using, by the user station, source address of the IP in IP packets as address of next hop station when transmitting data packets reversely.

12. The method according to claim 1, wherein, transmitting the data transmitted by the user station in the original cell in the new cell based on the configured convergence link table, comprises:
in addition to data packet transmission between the original AP and a correspondent station of the first user station, encapsulating an original IP packet by means of IP in IP at each station, in which the original IP packet encapsulated is the data packet transmitted between the original AP and the user station in the original cell.

13. A wireless network convergence system, comprising:
a user management system in an external network configured to manage a plurality of wireless network cells connected to the external network, each wireless network cell having an access point (AP) that connects to one or more user stations in the wireless network cell; and
a plurality of APs each set with a convergence link table, the convergence link table of the AP including a wireless forwarding table and a transfer-out link table, wherein each entry of the wireless forwarding table records a correspondence between an IP address and a MAC addresses of a user station in the wireless network cell, and each entry of the transfer-out link table records a correspondence between an IP address of a user station before leaving the wireless network cell and global IP address information of a transfer-out target station after the user station leaves the wireless network cell, wherein
a user management system including a user manager that dynamically configures the convergence link table in the AP, including:
when a first user station moves from an original cell having an original AP to a new cell having a current AP, obtaining a name of the first user station, a current IP address of the first user station in the new cell, and a global IP address of the current AP reported by the current AP;
determining, according to the name of the first user station, a global IP address of the original AP and an original IP address of the first user station in the original cell; and
sending, to the original AP, the original IP address of the first user station in the original cell and current global IP address information of the first user station to configure a first entry of the transfer-out link table of the original AP, wherein the global IP address information of the transfer-out target station in the first entry is configured to be the current IP address of the first user station if the first user station is configured with a global IP in the new cell, and to include both the current IP address of the first user station and the global IP address of the current AP if the first user station is configured with a local IP in the new cell,
wherein data that the first user station transmitted in the original cell is transmitted to the new cell based on the transfer-out link table of the original AP and a wireless forwarding table of the current AP.

14. A system according to claim 13, wherein the user management system comprising:
a user manager, configured to manage latest location information of user stations and configure the convergence link table of the APs; or,
at least two user managers and one user information aggregator, configured to uniformly summarize the location information of the user stations; wherein,
the user location information table is set in the user manager and includes a data field for name of user station, a data field for IP address of user station in current cell and a data filed for global IP address of current AP where the user station is located, and
the user location information summary table is set in the user information summary device.

15. A first access point (AP) device of a first wireless network cell, comprising:
a memory that stores a convergence link table configured to provide data transmission link information between an AP in previous cell and user station in new cell when the user station moves across wireless network cells, the convergence link table at least includes a wireless forwarding table and a transfer-out link table, wherein each entry of the wireless forwarding table records a correspondence between an IP address and a MAC addresses of a user station in the wireless network cell, and each entry of the transfer-out link table records a correspondence between an IP address of a user station before leaving the wireless network cell and global IP address information of a transfer-out target station after the user station leaves the wireless network cell;
wherein the first AP is configured to:
receive, when a first user station moves from the first cell having the first AP to a new cell having a current AP, from a user management system in an external network, an original IP address of the first user station in the first cell and current global IP address information of the first user station to configure a first entry of the transfer-out link table of the first AP;
configure, the global IP address information of the transfer-out target station in the first entry to: be the current IP address of the first user station if the first user station is configured with a global IP in the new cell, and include both the current IP address of the first user station and the global IP address of the current AP if the first user station is configured with a local IP in the new cell; and
transmit data that the first user station transmitted in the first cell to the new cell based on the transfer-out link table of the first AP.

16. The first AP device according to claim 15, wherein,
said wireless forwarding table is used for indicating information on a user station has left current cell, entered a new cell when the MAC address of the user station becomes invalid,
for the user station that has not moved across-cell in a cell, the first AP is configured to implement a function of normal wireless forwarding according to the correspondences recorded in the wireless forwarding table.

17. The first AP device according to claim 15, wherein the first AP is further configured to:
receive a data packet from a correspondent station of the first user station, a destination of the data packet being the first user station;
query the first user station in the wireless forwarding table and determine that the first user station has left the first cell in response to the MAC address of the first user station being invalid;
query, using the original IP address of the first user station in the first cell, the first user station in the transfer-out link table to determine the global IP address information of a transfer-out target station corresponding to the first user station; and forward, according to the global IP address information of the transfer-out target station, the data packet from the correspondence station to the transfer-out target station.

18. The first AP device according to claim 15, wherein the first AP is further configured to:
   receive, an IP in IP data packet from a sender station having a sender global IP address;
   de-capsulate the IP in IP packet to obtain a source address of an inner IP packet and a source address of an outer IP packet;
   query, using the source address of the inner IP packet and the source address of the outer IP packet, in the transfer-out link table to find the first entry with the original IP address of the first user station matching the source address of the inner IP packet and with the global IP address information of the transfer-out target station matching the source address of the outer IP packet; and
   transmit data contained in the IP in IP packet to a destination address of the inner IP packet.

19. The first AP device according to claim 15, wherein the first AP configures user stations in the first cell with local IP addresses, the convergence link table further includes a transfer-in link table, and the first AP is further configured to: when a second user station moves from a previous cell having a previous AP to the first cell,
   configure a current IP address for the second user station in the first cell;
   report, to the user management system, a name of the first user station, the current local IP address of the second user station in the first cell, and a global IP address of the first AP;
   receive, from the user management system, a signaling to configure the transfer-in link table of the first AP with a global IP address of the previous AP and an IP address of the second user station in the previous cell; and
   create an entry in the transfer-in link table, the entry including the global IP address of the previous AP, the IP address of the second user station in the previous cell, and the current local IP address of the second user station in the first cell.

20. The first AP device according to claim 19, wherein when the second user station moves from the previous cell having the previous AP to the first cell, the first AP is further configured to:
   send a signaling to the second user station to configure an address of a next hop station of a reverse transmission data packet, the address of the next hop station of the reverse transmission data packet being a local IP address of the first AP, the reverse transmission data packet being a data packet from the second user station to a correspondent station of the second user station.

* * * * *